(12) United States Patent
Chen et al.

(10) Patent No.: US 9,974,095 B2
(45) Date of Patent: May 15, 2018

(54) HEW STATION AND METHOD FOR UL MU-MIMO HEW WITH IMPROVED RECEIVER PERFORMANCE

(71) Applicant: Intel IP Corporation, Santa Clara, CA (US)

(72) Inventors: Xiaogang Chen, Beijing (CN); Qinghua Li, San Ramon, CA (US); Thomas J. Kenney, Portland, OR (US); Honggang Li, Beijing (CN); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 64 days.

(21) Appl. No.: 15/025,434

(22) PCT Filed: Sep. 26, 2014

(86) PCT No.: PCT/CN2014/087516
§ 371 (c)(1),
(2) Date: Mar. 28, 2016

(87) PCT Pub. No.: WO2015/074461
PCT Pub. Date: May 28, 2015

(65) Prior Publication Data
US 2016/0242205 A1      Aug. 18, 2016

Related U.S. Application Data

(60) Provisional application No. 61/906,059, filed on Nov. 19, 2013, provisional application No. 61/973,376, (Continued)

(51) Int. Cl.
*H04W 72/12* (2009.01)
*H04B 7/0452* (2017.01)
(Continued)

(52) U.S. Cl.
CPC ...... *H04W 72/1284* (2013.01); *H04B 7/0452* (2013.01); *H04L 27/2614* (2013.01);
(Continued)

(58) Field of Classification Search
CPC ..... H04B 7/0452; H04W 84/12; H04L 5/0053
See application file for complete search history.

(56) References Cited

U.S. PATENT DOCUMENTS 7,809,020 B2    10/2010  Douglas et al.
2007/0014375 A1   1/2007  Nakao
(Continued)

FOREIGN PATENT DOCUMENTS

CN    101433018 A    5/2009
CN    102377468 A    3/2012
(Continued)

OTHER PUBLICATIONS

"Taiwanese Application Serial No. 104118504, Office Action dated Apr. 21, 2017", 14 pgs.
(Continued)

*Primary Examiner* — Chandrahas B Patel
(74) *Attorney, Agent, or Firm* — Schwegman Lundberg & Woessner, P.A.

(57) ABSTRACT

Embodiments of a high-efficiency WLAN (HEW) master station and method for communicating in a Wireless Network are generally described herein. In some embodiments, the HEW master station comprises a receiver configured to receive an uplink multi-user multiple-input multiple-output (MU-MIMO) transmission from a plurality of scheduled HEW stations. The uplink MU-MIMO transmission may comprise at least an HEW short-training field (STF) (HEW-STF) transmitted by each of the scheduled HEW stations. The HEW-STFs received from the HEW stations are distinguishable. The master station may process the HEW-STFs
(Continued)

received from the scheduled HEW stations to set receiver gain for reception of UL-MIMO data from the scheduled HEW stations. In some embodiments, a single automatic gain control (AGC) setting may be determined from the combined HEW-STF resulting in improved receiver performance in UL MU-MIMO.

19 Claims, 4 Drawing Sheets

Related U.S. Application Data filed on Apr. 1, 2014, provisional application No. 61/976,951, filed on Apr. 8, 2014, provisional application No. 61/986,256, filed on Apr. 30, 2014, provisional application No. 61/986,250, filed on Apr. 30, 2014, provisional application No. 61/991,730, filed on May 12, 2014, provisional application No. 62/013,869, filed on Jun. 18, 2014, provisional application No. 62/026,277, filed on Jul. 18, 2014.

(51) Int. Cl.
*H04L 27/26* (2006.01)
*H04W 52/52* (2009.01)
*H04W 72/04* (2009.01)
*H04W 84/12* (2009.01)

(52) U.S. Cl.
CPC ....... *H04W 52/52* (2013.01); *H04W 72/0453* (2013.01); *H04W 84/12* (2013.01)

(56) References Cited

U.S. PATENT DOCUMENTS

| | | | |
|---|---|---|---|
| 2007/0242600 | A1 | 10/2007 | Li et al. |
| 2008/0049851 | A1 | 2/2008 | Nangia et al. |
| 2008/0188232 | A1 | 8/2008 | Park et al. |
| 2010/0080312 | A1 | 4/2010 | Moffatt et al. |
| 2010/0260159 | A1 | 10/2010 | Zhang et al. |
| 2010/0290449 | A1 | 11/2010 | Van Nee et al. |
| 2011/0075625 | A1 | 3/2011 | Nyström et al. |
| 2011/0194544 | A1 | 8/2011 | Yang et al. |
| 2011/0305178 | A1 | 12/2011 | Zheng et al. |
| 2012/0201213 | A1 | 8/2012 | Banerjea et al. |
| 2013/0070750 | A1 | 3/2013 | Kim et al. |
| 2013/0177090 | A1 | 7/2013 | Yang et al. |
| 2013/0301551 | A1* | 11/2013 | Ghosh ................ H04W 72/042 370/329 |
| 2014/0169245 | A1 | 6/2014 | Kenney et al. |
| 2014/0169356 | A1 | 6/2014 | Noh et al. |

FOREIGN PATENT DOCUMENTS

| | | |
|---|---|---|
| CN | 102714631 A | 10/2012 |
| CN | 102790662 A | 11/2012 |
| CN | 103703711 A | 4/2014 |
| CN | 106063146 A | 10/2016 |
| EP | 3080923 A1 | 10/2016 |
| TW | 200539601 A | 12/2005 |
| TW | 201044815 A | 12/2010 |
| TW | 201141288 A | 11/2011 |
| TW | 201234880 A | 8/2012 |
| TW | 201322786 A | 6/2013 |
| TW | 201406107 A | 2/2014 |
| TW | 201540118 A | 10/2015 |
| TW | 201541890 A | 11/2015 |
| TW | 201605191 A | 2/2016 |
| TW | 201608863 A | 3/2016 |
| TW | 201632022 A | 9/2016 |
| TW | I573413 B | 3/2017 |
| TW | I578838 B | 4/2017 |
| WO | WO-2015074461 A1 | 5/2015 |

OTHER PUBLICATIONS

"Taiwanese Application Serial No. 104122567, Response Filed Apr. 13, 2017 to Office Action dated Oct. 13, 2016", (W/O English Claims), 9 pgs.
"International Application Serial No. PCT/CN2014/087516, International Search Report dated Dec. 31, 2014", 4 pgs.
"International Application Serial No. PCT/CN2014/087516, Written Opinion dated Dec. 31, 2014", 4 pgs.
"International Application Serial No. PCT/CN2014/087516, International Preliminary Report on Patentability dated May 24, 2016", 5 pgs.
"Taiwanese Application Serial No. 104106275, Office Action dated Jun. 8, 2016", W/ Machine Translation, 5 pgs.
"Taiwanese Application Serial No. 104106275, Response filed Sep. 6, 2016 to Office Action dated Jun. 8, 2016", W/ English Claims, 80 pgs.
"Taiwanese Application Serial No. 104108807, Office Action dated May 26, 2016", W / English Search Report, 10 pgs.
"Taiwanese Application Serial No. 104108807, Response filed Nov. 25, 2016 Office Action dated May 26, 2016", W/ English Claims, 65 pgs.
"Taiwanese Application Serial No. 104118504, Office Action dated Jul. 21, 2016", W/ English Search Report, 12 pgs.
"Taiwanese Application Serial No. 104118504, Response filed Oct. 18, 2016 to Office Action dated Jul. 21, 2016", W/ English Claims, 104 pgs.
"Taiwanese Application Serial No. 104122567, Office Action dated Oct. 13, 2016", W/ English Search Report, 8 pgs.
"Taiwanese Application Serial No. 105113980, Office Action dated Jul. 21, 2016", W/ English Claims, 18 pgs.
"Taiwanese Application Serial No. 105113980, Response filed Oct. 24, 2016 to Office Action dated Jul. 21, 2016", W/ English Claims, 80 pgs.
Choi, Jinsoo, "Discussion on OFDMA in HEW", In: IEEE P802.11—High Efficiency WLAN Study Group, (Nov. 11, 2013), 11 pgs.
"11ah Preamble for 2Mhz and Beyond", IEEE Submission No. IEEE 802.1-11/1483r2, 1-24, Jan. 16, 2012.
"European Application Serial No. 14864488.3, Extended European Search Report dated Jul. 21, 2017", 7 pgs.
"Taiwanese Application Serial No. 104118504, Response Filed Jul. 20, 2017 to Office Action dated Apr. 21, 2017", (W/ English Claims), 13 pgs.
"Taiwanese Application Serial No. 104122567, Office Action dated Jun. 27, 2017", (W/ Partial English Translation), 5 pgs.
Chun, Jinyoung, et al., "Legacy Support on HEW frame structure", IEEE 11-13/1057r0, (Sep. 1, 2013), 8 pgs.

\* cited by examiner

HEW PREAMBLE AND PACKET STRUCTURE

HEW STATION AND METHOD FOR UL MU-MIMO HEW WITH IMPROVED RECEIVER PERFORMANCE

PRIORITY CLAIMS

This application is a U.S. National Stage Application under 35 U.S.C. 371 from International Application No. PCT/CN2014/087516, filed Sep. 26, 2014, which claims the benefit of priority to the following U.S. Provisional Patent Applications:

Ser. No. 61/906,059, filed Nov. 19, 2013,
Ser. No. 61/973,376, filed Apr. 1, 2014,
Ser. No. 61/976,951, filed Apr. 8, 2014,
Ser. No. 61/986,256, filed Apr. 30, 2014,
Ser. No. 61/986,250, filed Apr. 30, 2014,
Ser. No. 61/991,730, filed May 12, 2014,
Ser. No. 62/013,869, filed Jun. 18, 2014, and
Ser. No. 62/026,277, filed Jul. 18, 2014,
which are all incorporated herein by reference in their entireties.

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to the High Efficiency WLAN Study Group (HEW SG) (named DensiFi) and referred to as the IEEE 802.11ax SG. Some embodiments relate to high-efficiency wireless or high-efficiency WLAN (HEW) communications. Some embodiments relate to uplink (UL) multi-user (MU) multiple-input multiple-output (MIMO) (UL MU-MIMO) communication.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). The frame structure used for conventional and legacy IEEE 802.11 communications including very-high throughput (VHT) communications may be less suitable for such high-density deployment situations. A recently-formed study group for Wi-Fi evolution referred to as the IEEE 802.11 High Efficiency WLAN (HEW) study group (SG) (i.e., IEEE 802.11ax) is addressing these high-density deployment scenarios.

UL MU-MIMO is one approach that may be used with HEW to improve efficiency and throughput. With UL MU-MIMO, transmissions may be received from several devices concurrently. One issue with UL MU-MIMO is determining the receiver gain since the transmissions from the different devices may be received at differing power levels and different noise levels.

Thus there are general needs for devices and methods for HEW communication including devices and method for UL MU-MIMO in HEW. There are also general needs for devices and methods for improved receiver performance including for setting receiver gain in UL MU-MIMO HEW.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
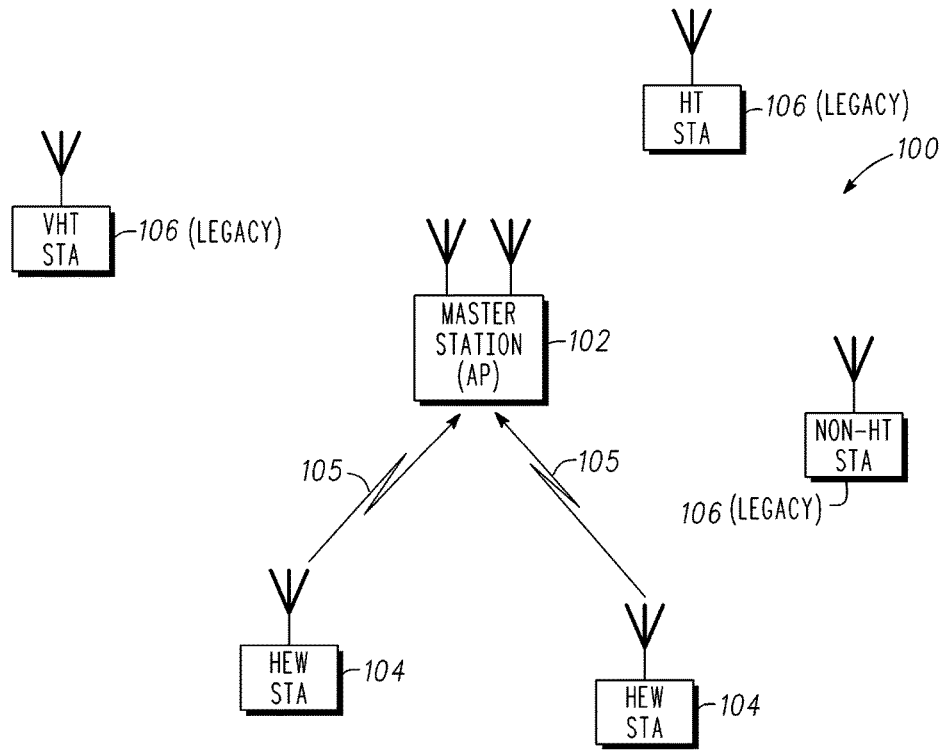
FIG. 1 illustrates a HEW network in accordance with some embodiments.

FIG. 1 illustrates a HEW network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some embodiments, the master station 102 may be arranged to communicate with the HEW stations 104 in accordance with an IEEE 802.11ax standard and communicate with the legacy stations 106 in accordance a legacy IEEE 802.11 standard (e.g., IEEE 802.11n, IEEE 802.11-2012, or IEEE 802.11ac).

Embodiments disclosed herein may provide a short-training field (STF) design for improved receiver performance in UL MU-MIMO HEW. In accordance with some embodiments, the master station 102 may be configured to receive an uplink multi-user multiple-input multiple-output (MU-MIMO) transmission 105 from a plurality of scheduled HEW stations 104. The uplink MU-MIMO transmission 105 may comprise, among other things, an HEW short-training field (STF) (HEW-STF) transmitted by each of the scheduled HEW stations 104. In these embodiments, the HEW-STFs received from the HEW stations 104 may be distinguishable. In these embodiments, the master station 102 may be configured to process the HEW-STF received from each of scheduled HEW stations 104 to set receiver gain for reception of UL-MIMO data from the scheduled HEW stations 104.

In some embodiments, the master station 102 may be configured to process the combined HEW-STF received from the scheduled HEW stations 104 to set receiver gain for reception of UL-MIMO data from the scheduled HEW stations 104. In these embodiments, the use of distinguishable or differently-configured STFs allows the short-training signals from each of the different stations to be able to contribute to the determination of the AGC setting as the lower-power level short-training signals received from further-away stations would not be masked by the higher-power short-training signals received from nearer stations.

In some alternate embodiments, instead of processing a combined HEW-STF 210 as a single field, the master station 102 may be configured to individually process the HEW-STF received from each of scheduled HEW stations 104 to set receiver gain for reception of UL-MIMO data from the scheduled HEW stations 104, although the scope of the embodiments is not limited in this respect.

In these embodiments, the HEW-STFs received from the HEW stations 104 may be distinguishable and may be differently-configured. For example, an HEW-STF transmitted by one HEW station 104 may have a low cross-correlation with respect to the HEW-STFs transmitted by the other scheduled HEW stations 104. In these embodiments, the use of distinguishable STFs in the uplink transmissions allow the master station 102 to distinguish the STF from each of the HEW stations 104. This allows the master station 102 to better set and/or update its receiver gain so that the master station 102 can better receive each HEW station's uplink data during the uplink MU-MIMO transmission. This may result in improved receiver gain and thus improved uplink performance. These embodiments are described in more detail below.

In some embodiments, the master station 102 may process the HEW-STF received from each of scheduled HEW stations 104 to determine a single automatic gain control (AGC) setting to set the receiver gain for reception of the UL-MIMO data from the scheduled HEW stations 104. In some embodiments, the use of distinguishable or differently-configured STFs allows the AGC setting to be determined based on these distinguishable or differently-configured STFs. In some embodiments, a single AGC setting may be determined for setting receiver gain for reception of UL-MIMO data from all scheduled HEW stations 104, although the scope of the embodiments is not limited in this respect as the AGC setting may be adjusted for multiple STAs that may be transmitting simultaneously at the same resource. These embodiments are described in more detail below.

In accordance with some HEW embodiments, the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 (e.g., using one or more HEW frames or packets). During the HEW control period, legacy stations 106 may refrain from communicating. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a MU-MIMO technique. These multiple-access techniques used during the HEW control period may be configured for uplink or downlink data communications.

The master station 102 may also communicate with legacy stations 106 in accordance with legacy IEEE 802.11 communication techniques (outside the control period). In some embodiments, the master station 102 may also be configurable communicate with the HEW stations 104 outside the HEW control period in accordance with legacy IEEE 802.11 communication techniques, although this is not a requirement.

In some embodiments, the HEW communications during the control period may be configurable to have bandwidths of one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams. HEW communications during the control period may be uplink or downlink communications.

Figure 2:
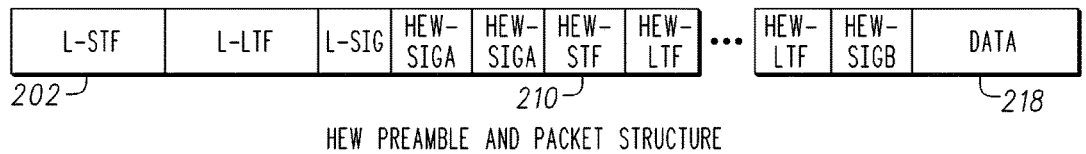
FIG. 2 illustrates an HEW packet in accordance with some embodiments.

FIG. 2 illustrates an HEW packet in accordance with some embodiments. HEW packet 200 includes, among other things, a legacy short training field (L-STF) 202, an HEW STF 210, and data field 218. The preamble portion of HEW packet 200 may include the fields before data field 218. In accordance with embodiments, the HEW packet 200 may be received as part of a MU-MIMO transmission 105 (FIG. 1) from a plurality of scheduled HEW stations 104. Each scheduled HEW station 104 may be configured to transmit an HEW STF 210 that is distinguishable from the HEW STFs transmitted by the other scheduled stations HEW stations. In these embodiments, the master station 102 may be configured to process the HEW-STF 210 received from each of scheduled HEW stations 104 to set receiver gain for reception of UL-MIMO data in data field 218 from the scheduled HEW stations 104. As mentioned above, the master station 102 may process the HEW-STF 210 received from each of scheduled HEW stations 104 to determine a single AGC setting to set the receiver gain for reception of the UL-MIMO data 218 from the plurality of scheduled HEW stations 104.

In some embodiments, the AGC setting may be initially determined based on receipt of the L-STF 202. The initially determined AGC setting may be updated based on receipt of the HEW-STFs 210 received from each of scheduled HEW stations 104. In these embodiments, the uplink MU-MIMO transmission 105 may include the L-STF 202. In these embodiments, each scheduled station may transmit the same L-STF 202 (i.e., the L-STFs 202 transmitted by each HEW station 104 may not be distinguishable). The L-STF 202 may comprise a known training sequence.

These embodiments provide a new preamble structure that may provide a better AGC setting for the UL MU-MIMO. The AGC uses the energy estimated from the short-training fields (both the L-STF 202 and the HEW-STF 210) to adjust the signal path gain and converge an AGC loop in order to help minimize A/D clipping and quantization noise thus helping to optimize receiver performance. Either over-estimating the STF signal or under-estimating the STF signal may lead to performance degradation in the baseband circuitry of the receiver. In previous versions of the standard (e.g., IEEE 802.11a/n/ac), each transmission was from one device only and the STFs (e.g., the very-high throughput STFs (VHT-STFs)) transmitted by each device were the same (e.g., not distinguishable). In UL MU MIMO, transmissions may be received from multiple devices simultaneously. Additionally, the signal power from each transmission seen at the receiver may have differing power levels. In accordance with embodiments, because the STFs 210 transmitted by each HEW station are distinguishable, the receiver is able to determine a better AGC setting. This would not be possible with the use of packet structures configured in accordance with previous versions of the standard since each station transmits the same the STF (e.g., the VHT-STF). Thus, the STF of the previous versions of the standard would not allow a proper AGC setting.

In some embodiments, the UL-MU-MIMO transmission 105 comprises a concurrent transmission by the scheduled HEW stations 104 on the same channel resources. In some embodiments, the channel resources comprise a 20 MHz channel, although that is not a requirement. In some embodiments, the channel resources may comprise a 20 MHz channel, a 40 MHz channel, an 80 MHz channel or a 160 MHz (80+80) channel.

In some embodiments, the HEW-STFs 210 may be received concurrently from each of scheduled HEW stations 104. The receiver may be configured to process the HEW-STF 210 received from each scheduled HEW station 104. In these embodiments, the HEW-STF 210 received from each scheduled HEW station 104 may arrive concurrently at the master station 102. In some embodiments, the single AGC setting for the receiver may be determined based on the sum of the processed HEW-STFs 210, although the scope of the embodiments is not limited in this respect. In these embodiments, the contribution from each HEW station 104 may be weighted equally, although that is not a requirement.

If the HEW-STFs 210 were not distinguishable from each other, the HEW-STF 210 from some (less than all) of the HEW stations 104 may be dominant resulting in a less than ideal single AGC setting for use with all the scheduled HEW stations 104. By using distinguishable HEW-STFs 210, the combined HEW-STF 210 from the HEW stations 104 may be processed together allowing a single AGC setting to be determined.

In some embodiments, the scheduled HEW stations 104 may be configured to adjust a transmission time of the UL MU-MIMO transmission 105 so that the HEW-STF 210 from each scheduled HEW station 104 arrive concurrently (e.g., at the same time) at the master station 102.

In some embodiments, the HEW-STF 210 transmitted by each of the scheduled HEW stations 104 may have one of a plurality of different cyclic-shift delays (CSD) applied to the HEW-STF 210. The use of different CSDs allows the HEW-STFs 210 from each of the scheduled HEW stations 104 to be distinguishable. In these embodiments, each of the scheduled HEW stations 104 is configured to apply one of a plurality of different CSDs to the HEW-STF 210.

In an example that includes four scheduled HEW stations 104, the first HEW station may apply a CSD of zero nanoseconds (ns) to its HEW-STF 210, the second HEW station may apply a CSD of −50 ns to its HEW-STF 210, the third HEW station may apply a CSD of −100 ns to its HEW-STF 210, and the fourth HEW station may apply a CSD of −150 ns to its HEW-STF 210, although the scope of the embodiments is not limited in this respect as other values of CSDs may be used. In these embodiments, the same training sequence with different cyclic-shift delays may be transmitted by each scheduled HEW station 104. In these embodiments, each of the scheduled HEW stations 104 is configured to apply the same CSD to all of the station's antennas.

In these embodiments that use different CSDs, each scheduled HEW station 104 may transmit the same training sequence on the same set of subcarriers, although this is not a requirement. In some of these embodiments, each scheduled HEW station 104 may be configured to randomly select one of a plurality of CSD values, while in other embodiments, the master station 102 may assign a CSD value to each scheduled HEW station 104.

In some embodiments, the HEW-STF 210 received from each of the scheduled HEW stations 104 may be received on a different subset of subcarriers (e.g., tones). These embodiments are described in more detail below.

In some embodiments, the HEW-STF 210 received from each of the scheduled HEW stations 104 comprises a different training sequence. These embodiments are described in more detail below.

Figure 3:
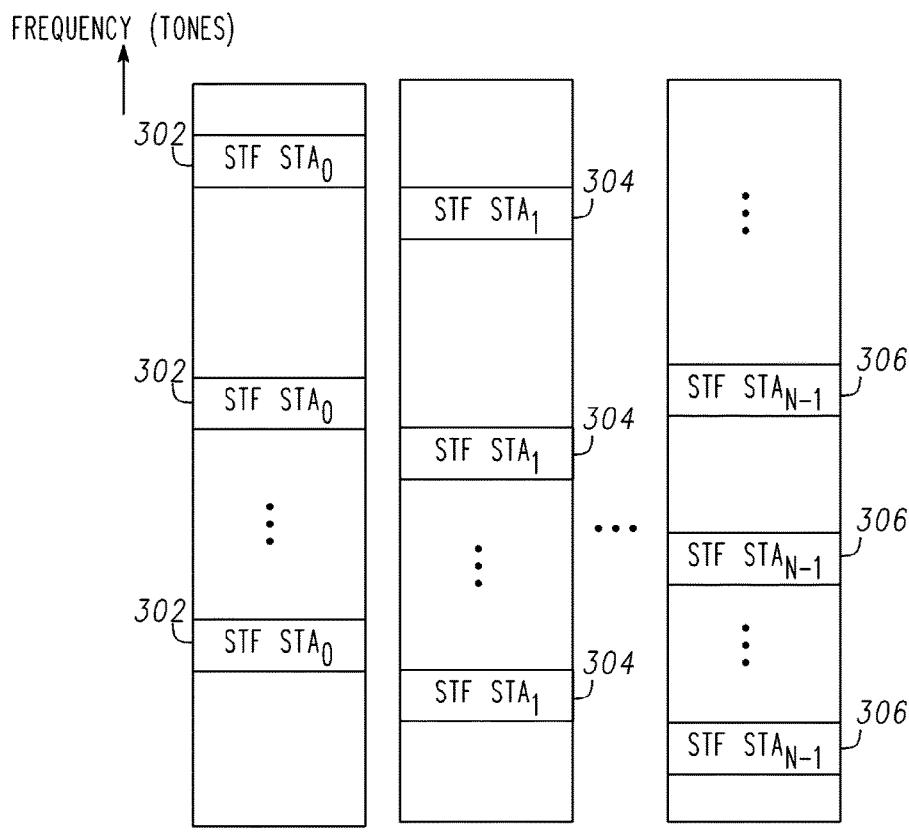
FIG. 3 illustrates the transmission of an HEW-STF by HEW stations on different tone sets in accordance with some embodiments.

FIG. 3 illustrates the transmission of an HEW-STF by HEW stations on different tone sets in accordance with some embodiments. In these embodiments, the HEW-STF 210 may be received from each of the scheduled HEW stations 104 on a different subset of subcarriers (e.g., tones). The subcarriers of each subset may be orthogonal. As illustrated in FIG. 3, STA0 may transmit on tone set 302, STA1 may transmit on tone set 304 . . . and STA N−1 may transmit on tone set 306. Each different tone set may be orthogonal in frequency. In these embodiments, the transmissions on different tone sets by each of the HEW stations 104 may be concurrent (i.e., configured to arrive at the master station 102 at the same time). In these embodiments, each scheduled HEW station 104 may transmit the same training sequence on a different set of subcarriers, although this is not a requirement. In these embodiments, since the HEW-STF transmissions are orthogonal, the same training sequence may be transmitted by each scheduled HEW station 104 allowing the HEW-STFs to be distinguishable. The training sequence of a conventional STF is not distinguishable as it is transmitted on all subcarriers of a predetermined set of subcarriers.

In some of these embodiments, each scheduled HEW station 104 may be configured to randomly select one of a plurality of predetermined subsets of subcarriers for transmission of the HEW-STF 210, while in other embodiments, the master station 102 may assign a subset of subcarriers to each scheduled HEW station 104.

As mentioned above, in some other embodiments, the HEW-STF 210 received from each of the scheduled HEW stations 104 may comprise a different training sequence. In these embodiments, each of the scheduled HEW station 104 may be configured to transmit a different training sequence within the HEW-STF 210. In these embodiments, the use of different training sequences may help to de-correlate the STFs transmitted by the different scheduled HEW stations 104. In some of these embodiments, each scheduled HEW station 104 may be configured to randomly select one of a plurality of different training sequences from a set of training sequences while in other embodiments the master station 102 may assign a different training sequence of the set to each scheduled HEW station 104.

In some of these embodiments, the different training sequences may be configured have a low peak-to-average power ratio (PAPR) and/or a low cross-correlation. For example, the different training sequences having a PAPR and/or a cross-correlation below a predetermined threshold may be used.

In some of these embodiments, the different training sequences may comprise a cyclically-shifted version of a root Zadoff-Chu (ZC) sequence with a predetermined length (i.e., N), although the scope of the embodiments is not limited in this respect. In these embodiments, ZC sequences having the same root value and length may be used. In some of these embodiments, the different STFs may be generated in the frequency domain by a cyclically shifted version of the same root sequence. In some embodiments, the following equation may be used to generate a ZC sequence of length N:

$$seq(M+1)=\exp(-j\cdot\pi\cdot R\cdot m\cdot (m+1)/N), \text{ for } m=0,\ldots N-1,$$

although the scope of the embodiments is not limited in this respect.

Figure 4:
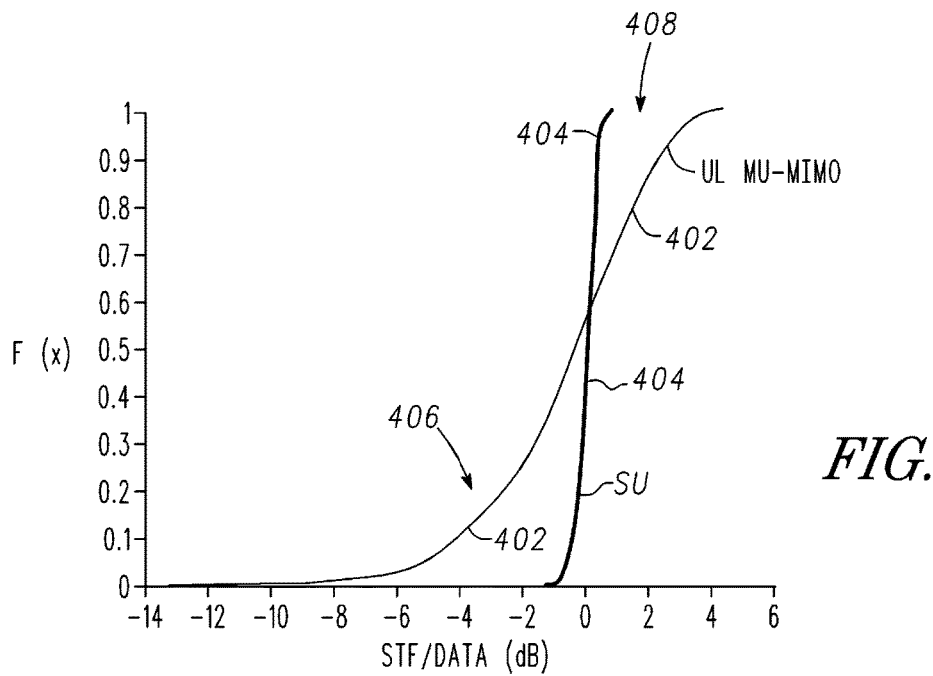
FIG. 4 illustrates simulation results comparing single user (SU) with UL MU-MIMO.

FIG. 4 illustrates simulation results comparing single user (SU) with UL MU-MIMO without the use of distinguishable STFs. In FIG. 4, curve 402 represents UL MU-MIMO communication without distinguishable STFs and curve 404 represents SU communication. As can be seen in FIG. 4, UL MU-MIMO communication has a much larger dynamic range than SU communications resulting in both an over-estimated STF (shown in region 406) and an under-estimated STF (shown in region 408). As mentioned above, an over-estimated STF or an under-estimated STF may degrade receiver performance at baseband due to a less-than-optimum receiver gain setting.

Figure 5:
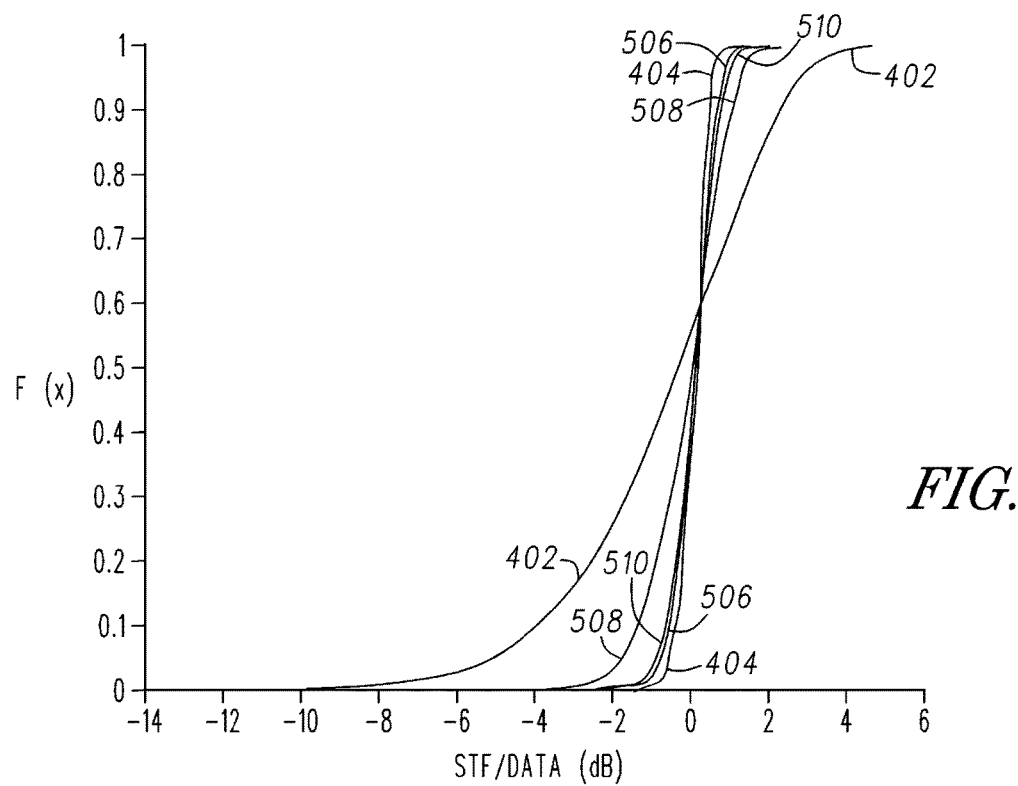
FIG. 5 illustrates simulation results comparing the performance of various embodiments of distinguishable STFs.

FIG. 5 illustrates simulation results comparing the performance of various embodiments using distinguishable STFs. In FIG. 5, curve 402 represents UL MU-MIMO communication without distinguishable STFs and curve 404 represents SU communication. Curve 506 represents the use of HEW-STF 210 received from each of the scheduled HEW stations 104 with CSDs as discussed above (i.e., intra cyclic-delay diversity (CDD)). Curve 508 represents the use of HEW-STF 210 received from each of the scheduled HEW stations 104 on different subset of orthogonal subcarriers (i.e., an STF shift) as described above (see FIG. 3). Curve 510 represents the use of HEW-STF 210 received from each of the scheduled HEW stations 104 where each HEW-STF 210 comprises a different training sequence. In these examples, the different training sequences comprise a cyclically-shifted version of a root Zadoff-Chu sequence of length eleven.

As can be seen from FIG. 5, the use of intra cyclic-delay diversity (CDD) (curve 506), the use of an STF shift (curve 508) or the use of different training sequences (curve 510) provide for improved STF estimation for UL MU-MIMO compared to UL MU-MIMO communication without distinguishable STFs (curve 402).

Figure 6:
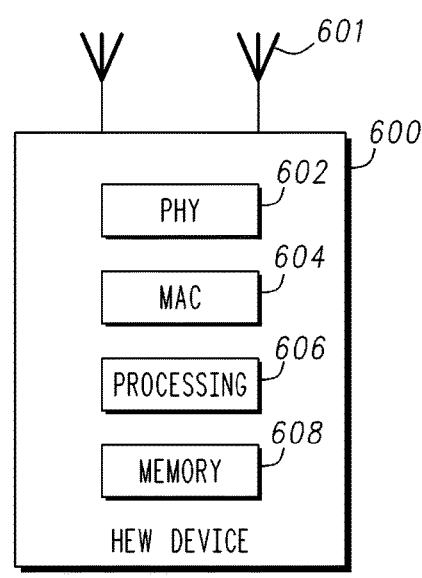
FIG. 6 illustrates an HEW device in accordance with some embodiments.

FIG. 6 illustrates an HEW device in accordance with some embodiments. HEW device 600 may be an HEW compliant device that may be arranged to communicate with one or more other HEW devices, such as HEW stations and/or a master station, as well as communicate with legacy devices. HEW device 600 may be suitable for operating as master station 102 (FIG. 1) or an HEW station 104 (FIG. 1). In accordance with embodiments, HEW device 600 may include, among other things, physical layer (PHY) circuitry 602 and medium-access control layer circuitry (MAC) 604. PHY 602 and MAC 604 may be IEEE 802.11ax (HEW) compliant layers and may also be compliant with one or more legacy IEEE 802.11 standards. PHY 602 may be arranged to transmit HEW frames. HEW device 600 may also include other processing circuitry 606 and memory 608 configured to perform the various operations described herein.

In accordance with some embodiments, the MAC 604 may be arranged to contend for a wireless medium during a contention period to receive control of the medium for the HEW control period and configure an HEW packet or frame. The PHY 602 may be arranged to transmit the HEW packet (e.g., HEW packet 200 (FIG. 2)) as discussed above. The PHY 602 may also be arranged to receive an HEW packet from HEW stations. MAC 604 may also be arranged to perform transmitting and receiving operations through the PHY 602. The PHY 602 may include circuitry for modulation/demodulation, upconversion/downconversion, filtering, amplification, etc. In some embodiments, the processing circuitry 606 may include one or more processors. In some embodiments, two or more antennas may be coupled to the physical layer circuitry arranged for sending and receiving signals including transmission of the HEW frame. The memory 608 may be store information for configuring the processing circuitry 606 to perform operations for configuring and transmitting HEW frames and performing the various operations described herein.

In some embodiments, the HEW device 600 may be configured to communicate using OFDM communication signals over a multicarrier communication channel. In some embodiments, HEW device 600 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 600 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 600 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 600 may include one or more of a keyboard, a display, a non-volatile memory port, multiple antennas, a graphics processor, an application processor, speakers, and other mobile device elements. The display may be an LCD screen including a touch screen.

The antennas 601 of HEW device 600 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 601 may be effectively separated to take advantage of spatial diversity and the different channel characteristics that may result between each of antennas and the antennas of a transmitting station.

Although HEW device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 600 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In some embodiments, when operating as a master station, HEW device 600 may be configured to obtain a transmission opportunity (TXOP) for use in communicating with the scheduled HEW stations 104 and receive the uplink MU-MIMO transmission 105 including the HEW-STFs 210 and the UL-MIMO data 218 from the scheduled stations 104 during the TXOP. The UL-MIMO data 218 may be received in accordance with an SDMA technique and/or an OFDMA technique.

In some embodiments, HEW device 600, when operating as a master station, may be configured to communicate with legacy stations 106 (FIG. 1) in accordance with a contention-based communication technique outside the TXOP and communicate with the scheduled HEW stations 104 during the obtained TXOP in accordance with a non-contention based communication technique.

In some embodiments, the HEW device 600 may include a receiver to receive the uplink MU-MIMO transmission 105 from the scheduled HEW stations 104. The receiver may be configured to process the HEW-STF 210 received from each of scheduled HEW stations 104 for setting the receiver's gain for reception of UL-MIMO data 218. In some embodiments, the receiver may be part of the PHY 602 (FIG. 6).

When operating as an HEW station 104, the HEW device 600 may be configured to transmit an HEW-STF 210 to an HEW master station 102, and transmit uplink data 218 to the HEW master station 102 following the HEW-STF 210. The uplink data 210 and the HEW-STF 210 may be part of an UL MU-MIMO transmission 105 comprising uplink transmissions from a plurality of scheduled HEW stations. The HEW-STF 210 may be configured to be distinguishable from the HEW-STFs 210 concurrently transmitted by the other HEW stations 104 as part of the uplink MU-MIMO transmission 105.

Figure 7:
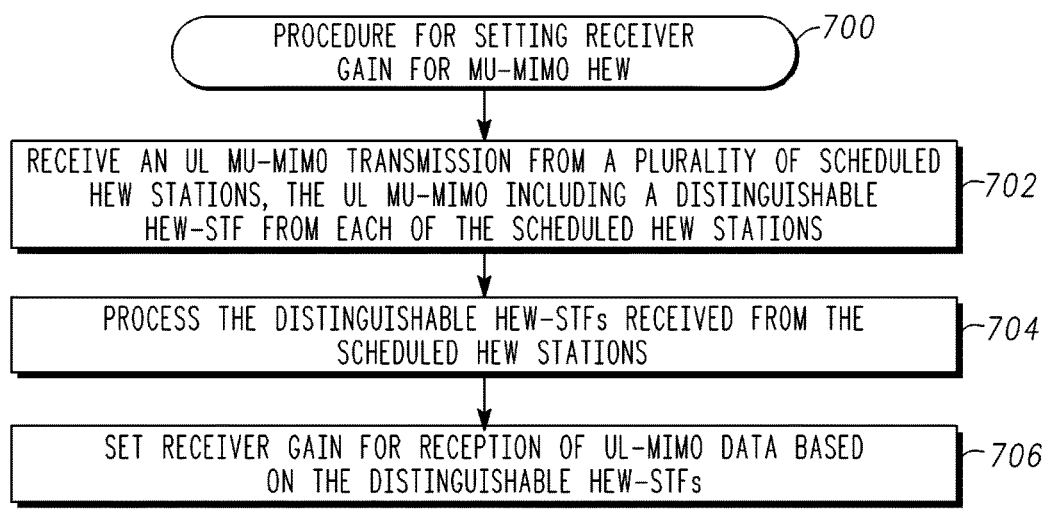
FIG. 7 illustrates a procedure for UL MU-MIMO communication in HEW in accordance with some embodiments.

FIG. 7 illustrates a procedure for UL MU-MIMO communication in HEW in accordance with some embodiments. Procedure 700 may be performed by an HEW master station, such as master station 102 (FIG. 1). In operation 702, the master station may receive a UL MU-MIMO transmission from HEW stations that includes distinguishable STFs.

In operation 704, the master station may process the HEW-STFs 210 received from the scheduled HEW stations 104. Since the HEW STFs are distinguishable, some STFs are not masked by other STFs allowing the contributions of all STFs to be used.

In operation 706, the master station may set receiver gain for reception of UL MU-MIMO data from the HEW stations based on the distinguishable STFs. In some embodiments, the receiver gain may be updated based on the processed STFs. A single AGC setting may be determined for receipt of UL MU-MIMO data, such as data 218 (FIG. 2).

In an example, a high-efficiency WLAN (HEW) master station comprising a receiver is configured to: receive an uplink multi-user multiple-input multiple-output (MU-MIMO) transmission from a plurality of scheduled HEW stations, the uplink MU-MIMO transmission comprising at least an HEW short-training field (STF) (HEW-STF) transmitted by each of the scheduled HEW stations; and process the HEW-STF received from each of scheduled HEW stations to set receiver gain for reception of UL-MIMO data from the scheduled HEW stations. The HEW-STFs received from the HEW stations are distinguishable.

In another example, the master station is configured to process the HEW-STF received from each of scheduled HEW stations to determine a single automatic gain control (AGC) setting to set the receiver gain for reception of the UL-MIMO data from the plurality of scheduled HEW stations.

In another example, the AGC setting is determined based on receipt of a legacy STF (L-STF), and the AGC setting is updated based on receipt of the HEW-STFs received from each of scheduled HEW stations.

In another example, the UL-MU-MIMO transmission comprises a concurrent transmission by the scheduled HEW stations on same channel resources, and the channel resources comprise one of a 20 MHz channel, a 40 MHz channel, an 80 MHz channel, and a 160 MHz (80+80) channel.

In another example, the HEW-STFs are received concurrently from each of scheduled HEW stations, the receiver is configured to process the HEW-STF received from each scheduled HEW station as a combined HEW-STF, the HEW-STF received from each scheduled HEW station arrive concurrently at the master station, and the single AGC setting is determined based on a sum of the HEW-STFs.

In another example, the HEW-STF received from each of the scheduled HEW stations has one of a plurality of different cyclic-shift delays (CSD) applied to the HEW-STF.

In another example, the HEW-STF received from each of the scheduled HEW stations is received on a different subset of subcarriers, and the subcarriers of each subset are orthogonal.

In another example, the HEW-STF received from each of the scheduled HEW stations comprises a different training sequence.

In another example, the different training sequences are configured have at least one of a low peak-to-average power ratio (PAPR) and a low cross-correlation.

In another example, the different training sequences comprise a cyclically-shifted version of a root Zadoff-Chu (ZC) sequence with a predetermined length.

In another example, the master station may be further configured to: obtain a transmission opportunity (TXOP) for use in communicating with the scheduled HEW stations; and receive the uplink MU-MIMO transmission including the HEW-STFs and the UL-MIMO data from the scheduled stations during the TXOP. The UL-MIMO data is received in accordance with at least one of a space-division multiple access (SDMA) technique and an orthogonal frequency division multiple access (OFDMA) technique.

In another example, the master station may communicate with legacy stations in accordance with a contention-based communication technique outside the TXOP, and may communicate with the scheduled HEW stations during the obtained TXOP in accordance with a non-contention based communication technique.

In another example, a method for communication is performed by a high-efficiency WLAN (HEW) master station. In this example, the method may include receiving an uplink multi-user multiple-input multiple-output (MU-MIMO) transmission from a plurality of scheduled high-efficiency WLAN (HEW) stations, the uplink MU-MIMO transmission comprising at least an HEW short-training field (STF) (HEW-STF) transmitted by each of the scheduled HEW stations; and processing the HEW-STF received from each of scheduled HEW stations to set receiver gain for reception of UL-MIMO data from the scheduled HEW stations. The HEW-STFs received from the HEW stations are distinguishable.

In another example, the method may include processing the HEW-STF received from the scheduled HEW stations as a combined HEW-STF to determine a single automatic gain control (AGC) setting to set the receiver gain for reception of the UL-MIMO data from the plurality of scheduled HEW stations.

In another example, a non-transitory computer-readable storage medium that stores instructions for execution by one or more processors to perform operations for communication by a high-efficiency WLAN (HEW) master station is disclosed. The operations to configure the master station to receive an uplink multi-user multiple-input multiple-output (MU-MIMO) transmission from a plurality of scheduled HEW stations, the uplink MU-MIMO transmission comprising at least an HEW short-training field (STF) (HEW-STF) transmitted by each of the scheduled HEW stations. The HEW-STFs received from the HEW stations being distinguishable. The operations may configure to master station to process the HEW-STF received from each of scheduled HEW stations to set receiver gain for reception of UL-MIMO data from the scheduled HEW stations.

In another example, the operations are to configure the master station to process the HEW-STF received from the scheduled HEW stations as a combined HEW-STF to determine a single automatic gain control (AGC) setting to set the receiver gain for reception of the UL-MIMO data from the plurality of scheduled HEW stations.

In another example, a high-efficiency WLAN (HEW) station comprising physical layer (PHY) layer circuitry is configured to: transmit an HEW short-training field (STF) (HEW-STF) to an HEW master station; and transmit uplink data to the HEW master station following the HEW-STF, the uplink data and the HEW-STF being part of an uplink multi-user multiple-input multiple-output (MU-MIMO) transmission comprising concurrent uplink transmissions from a plurality of scheduled HEW stations. The HEW-STF is configured to be distinguishable from the HEW-STFs concurrently transmitted by the other HEW stations as part of the uplink MU-MIMO transmission.

In another example, the PHY layer circuitry of the HEW station may further be configured to: receive a control transmission at the beginning of an HEW control period, the control transmission indicating that the HEW station is one of the plurality of scheduled HEW stations that are scheduled for the uplink MU-MIMO transmission during the HEW control period; and transmit the uplink MU-MIMO transmission in accordance with an orthogonal frequency division multiple access (OFDMA) technique. The control period is a transmission opportunity obtained by the master station.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an high-efficiency (HE) access point, the apparatus comprising memory; and processing circuitry coupled to the memory, the processing circuitry configured to:

decode an uplink multi-user multiple-input multiple-output (MU-MIMO) transmission from a plurality of scheduled HE stations, the uplink MU-MIMO transmission comprising at least an HE short-training field (STF) (HE-STF) transmitted by each of the scheduled HE stations, wherein the HE-STF received from each of the scheduled HE stations is received on a different subset of subcarriers, and wherein the subcarriers of each subset are orthogonal; and process the HE-STF received from each of scheduled HE stations to determine a single automatic gain control (AGC) setting to set receiver gain for reception of UL-MIMO data from the plurality of scheduled HE stations.

2. The apparatus of claim 1 wherein the AGC setting is determined based on receipt of a legacy STF (L-STF), and wherein the AGC setting is updated based on receipt of the HE-STFs received from each of scheduled HE stations.

3. The apparatus of claim 2 wherein the UL-MU-MIMO transmission comprises a concurrent transmission by the scheduled HE stations on same channel resources, and wherein the channel resources comprise one of a 20 MHz channel, a 40 MHz channel, an 80 MHz channel, and a 160 MHz (80+80) channel.

4. The apparatus of claim 3 wherein the HE-STFs are received concurrently from each of scheduled HE stations, wherein the receiver is configured to process the HE-STF received from each scheduled HE station as a combined HE-STF, wherein the HE-STF received from each scheduled HE station arrive concurrently at the master station, and wherein the single AGC setting is determined based on a sum of the HE-STFs.

5. The apparatus of claim 1 wherein the HE-STF received from each of the scheduled HE stations has one of a plurality of different cyclic-shift delays (CSD) applied to the HE-STF.

6. The apparatus of claim 1 wherein the HE-STF received from each of the scheduled HE stations comprises a different training sequence.

7. The apparatus of claim 6 wherein the different training sequences are configured have at least one of a low peak-to-average power ratio (PAPR) and a low cross-correlation.

8. The apparatus of claim 6 wherein the different training sequences comprise a cyclically-shifted version of a root Zadoff-Chu (ZC) sequence with a predetermined length.

9. The apparatus of claim 1 further configured to:
obtain a transmission opportunity (TXOP) for use in communicating with the scheduled HE stations; and
receive the uplink MU-MIMO transmission including the HE-STFs and the UL-MIMO data from the scheduled stations during the TXOP,
wherein the UL-MIMIO data is received in accordance with at least one of a space-division multiple access (SDMA) technique and an orthogonal frequency division multiple access (OFDMA) technique.

10. The apparatus of claim 1 further configured to communicate with legacy stations in accordance with a contention-based communication technique outside the TXOP, and communicate with the scheduled HE stations during the obtained TXOP in accordance with a non-contention based communication technique.

11. The apparatus of claim 1, wherein the memory is configured to store the uplink MU-MIMO transmission.

12. A method for communication performed by a high-efficiency WLAN (HEW) master station, the method comprising:
decode an uplink multi-user multiple-input multiple-output (MU-MIMO) transmission from a plurality of scheduled HE stations, the uplink MU-MIMO transmission comprising at least an HE short-training field (STF) (HE-STF) transmitted by each of the scheduled HE stations, wherein the HE-STF received from each of the scheduled HE stations is received on a different subset of subcarriers, and wherein the subcarriers of each subset are orthogonal; and
processing the HE-STF received from each of scheduled HE stations to determine a single automatic gain control (AGC) setting to set receiver gain for reception of UL-MIMO data from the plurality of scheduled HE station.

13. The method of claim 12 wherein the HE-STF received from each of the scheduled HE stations has one of a plurality of different cyclic-shift delays (CSD) applied to the HE-STF.

14. The method of claim 12 wherein the HE-STF received from each of the scheduled HE stations is received on a different subset of subcarriers, and
wherein the subcarriers of each subset are orthogonal.

15. The method of claim 12 wherein the HE-STF received from each of the scheduled HE stations comprises a different training sequence.

16. A non-transitory computer-readable storage medium that stores instructions for execution by one or more processors of an high-efficiency (HE) access point, the one or more processors configured to:
decode an uplink multi-user multiple-input multiple-output (MU-MIMO) transmission from a plurality of scheduled HE stations, the uplink MU-MIMO transmission comprising at least an HE short-training field (STF) (HE-STF) transmitted by each of the scheduled HE stations, wherein the HE-STF received from each of the scheduled HE stations is received on a different subset of subcarriers, and wherein the subcarriers of each subset are orthogonal, and
process the HE-STF received from each of scheduled HE stations to determine a single automatic gain control (AGC) setting to set receiver gain for reception of UL-MIMO data from the plurality of scheduled HE stations.

17. A high-efficiency (HE) station comprising: memory; and, processing circuitry coupled to the memory, the processing circuitry configured to:
transmit an HE short-training field (STF) (HE-STF) to an HE access point; and
transmit uplink data to the HE access point following the HE-STF, the uplink data and the HE-STF being part of an uplink multi-user multiple-input multiple-output (MU-MIMO) transmission comprising concurrent uplink transmissions from a plurality of scheduled HE stations,
wherein the HE-STF is configured on a different subset of subcarriers than the other HE stations of the plurality of scheduled HE stations, and wherein the subcarriers of each subset are orthogonal.

18. The HE station of claim 17 wherein the processing circuitry is further configured to:
receive a control transmission at the beginning of an HE control period, the control transmission indicating that the HEW station is one of the plurality of scheduled HE stations that are scheduled for the uplink MU-MIMO transmission during the HE control period; and
transmit the uplink MU-MIMO transmission in accordance with an orthogonal frequency division multiple access (OFDMA) technique,
wherein the control period is a transmission opportunity obtained by the HE access point.

19. The apparatus of claim 17, wherein the memory is configured to store the HE-STF.

\* \* \* \* \*